United States Patent [19]
Duvalsaint et al.

[11] Patent Number: 5,652,853
[45] Date of Patent: Jul. 29, 1997

[54] MULTI-ZONE RELOCATION FACILITY COMPUTER MEMORY SYSTEM

[75] Inventors: Karl Jean Duvalsaint, Hyde Park; Peter Hermon Gum, Poughkeepsie; Moon Ju Kim, Wappingers Falls; Barry Watson Krumm, Poughkeepsie; Donald William McCauley, Pleasant Valley; John Fenton Scanlon, Hyde Park, all of N.Y.

[73] Assignee: International Business Machines Corporation, Armonk, N.Y.

[21] Appl. No.: 455,818

[22] Filed: May 31, 1995

Related U.S. Application Data

[62] Division of Ser. No. 14,977, Feb. 8, 1993, abandoned.

[51] Int. Cl.$^6$ .................................................... G06F 12/10
[52] U.S. Cl. ............................................ 395/406; 395/413
[58] Field of Search ................................. 395/406, 425, 395/413

[56] References Cited

U.S. PATENT DOCUMENTS

| | | | |
|---|---|---|---|
| 4,075,694 | 2/1978 | Ericsson | 395/412 |
| 4,685,057 | 8/1987 | Lemone et al. | 395/421.11 |
| 4,761,737 | 8/1988 | DuVall et al. | 395/419 |
| 5,345,590 | 9/1994 | Ault et al. | 364/280.6 |
| 5,371,867 | 12/1994 | George et al. | 395/406 |

FOREIGN PATENT DOCUMENTS

| | | |
|---|---|---|
| 0301275 | 2/1989 | European Pat. Off. |
| 64-37636 | 2/1989 | Japan |
| 2-33639 | 4/1990 | Japan |
| 2-239349 | 12/1990 | Japan |
| 3-211629 | 12/1991 | Japan |
| 4-181340 | 10/1992 | Japan |
| 4-348434 | 12/1992 | Japan |
| 2256513 | 12/1992 | United Kingdom |

OTHER PUBLICATIONS

"Processor Resource/Systems Manager Planning Guide for the ES/3090 Processor Complex" IBM Pub. #GA22-7123-10 Aug. 1993.

*Primary Examiner*—Jack A. Lane
*Attorney, Agent, or Firm*—Lynn L. Augspurger; Laurence J. Marhoefer

[57] ABSTRACT

A memory reconfiguration system now allows a guest's absolute storage space to be mapped to multiple discontiguous host absolute storage space. A multi-zone relocation facility is provided for relocating multiple zones of the memory of the computer system. A control program being executed in its data processing system to reconfigure storages that are assigned to guests when sufficient real addressing capability is not available to provide a range of holes in the host absolute addressing space. Memory can be reconfigured by a control program that allows main storage, and expanded storage associated with a guest's real storage to be mapped to multiple discontiguous areas of host absolute spaces. When sufficient real addressing is not available in the host absolute addressing space it allows expansion of the host absolute storage space that maps a guest storage. The system can be used in scalar, parallel and massively parallel computer systems having plural logical processors (LPARs).

1 Claim, 8 Drawing Sheets

P101 = PARTITION 1 (ZONE 1) ORIGIN 1
P1L1 = PARTITION 1 (ZONE 1) LIMIT 1
P102 = PARTITION 1 (ZONE 1) ORIGIN 2
P1L2 = PARTITION 1 (ZONE 1) LIMIT 2

BOUNDARY VALUE (BV) = MSL1 − MS01

| 0 | F | RESERVED | MS01 |
|---|---|---|---|
| 1 | | RESERVED | MSL1 |
| 2 | RESERVED | ES01 | |
| 3 | RESERVED | ESL1 | |
| 4 | | RESERVED | MS02 |
| 5 | | RESERVED | MSL2 |
| 6 | RESERVED | ES02 | |
| 7 | RESERVED | ESL2 | | dict
MULTI-ZONE RELOCATION FACILITY COMPUTER MEMORY SYSTEM

This is a division of application of Karl J. Duvalsaint et al. entitled "Multi-Zone Relocation Facilty Computer Memory System," Ser. No. 08/014,977, filed Feb. 8, 1993, now abandoned.

FIELD OF THE INVENTION

This invention is related to computer systems and to a computer having a multi (dual) zone relocation facility capable of relocating multiple zones of the memory of the computer system, and particularly to a computer system method and apparatus allowing a control program being executed in its data processing system to reconfigure storages that are assigned to guests when sufficient real addressing capability is not available to provide a range of holes in the host absolute addressing space.

CROSS REFERENCE TO RELATED APPLICATIONS

In general, there have been prior developments for systems which preceded the present system, as described in U.S. patent application Ser. No. 07/576,344 filed Aug. 31, 1990, now U.S. Pat. No. 5,345,590 by Ault et al and entitled Method and Apparatus for Cross-Partition Control in a Partitioned Process Environment. The invention there described has been published in Europe, as an example, in European Patent Application publication 472,861 on Jul. 5, 1991.

GLOSSARY OF TERMS

For convenience we will define new terms as used in this application.

Multi-Zone (Dual-Zone)

Storage partitions are composed of plural (two or more) segments, with each segment being designated by the storage origin and the storage limit. In this application, only two segments are used.

DSR (Dynmaic Storage Reconfiguration)

The DSR is defined as a function which allows the amount of main storage or expanded storage allocated to one or more partitions to be changed dynamically. The concept of a dynamic storage reconfiguration was first presented in the International Business Machines Corporation's processor complex ES/3090 (see the reference below).

REFERENCES USED IN THE DISCUSSION OF THE INVENTION

The IBM ES/3090 could perfrom a sort of Dynamic Storage Reconfiguration, as will be described. A publication about this machine was the Processor Resource/Systems Manager Planning Guide for the ES/3090 Processor Complex, IBM Publication No. GA22-7123-8, published Nov. 12, 1992.

BACKGROUND OF THE INVENTION

In the IBM ES/3090 Processor Complex is a PR/SM machine having an LPAR hypervisor. PR/SM refers to the machine hardware facility which allows the resources of a single physical system to be divided between distinct, predefined logical machines called "partitions." The separation and allocation of these physical resources is supported by the interpretive-execution facility of the machine and is performed by the hypervisor internal code called "LPAR". LPAR is a hypervisor or a virtual-machine monitor and in an overall system context can be referred to as the "host." Similarly, the individual partitions can be called "guest" machines.

In a PR/SM environment, some amount of contiguous host storage is made available to each of the logical partitions being managed by LPAR. Guest absolute storage is mapped into host absolute storage, and this segmentation and allocation of storage is accomplished by associating host storage "origin" and "limit" parameters for each logical partition. For each partition there is an origin value which designates where in host absolute storage that partition's storage begins, and a limit value that specifies where the partition's storage ends. As part of each guest storage reference, an origin value is added to the guest absolute address and the sum is then tested against the limit value to make sure that the referenced location is within the guest's storage. If the referenced location is not within the guest's storage, then a guest addressing exception exists. (There are no origin and limit parameters for partition 0 since a block of storage beginning at absolute address 0 is reserved for LPAR.)

The particular Dynamic Storage Reconfiguration of the ES/3090 and its successors to the present have provided a PR/SM function which allows the amount of main storage or expanded storage allocated to one or more PR/SM partitions to be changed dynamically, that is by a control program, in which DSR operations are usually initiated by the PR/SM operator and are then performed by LPAR with the assistance of the processor controller element (PCE) and the processor control program in the processor controller element.

The main storage configuration array (MSCA) is in this old machine used to translate or convert the absolute addresses used by the program running on the system to the physical addresses used to access the arrays which constitute the system's main storage. During a storage access, selected high-order bits of the absolute address were used to select an MSCA entry which, if marked valid, contained the physical array address of a block of main storage.

On machines which provide 31 bits of addressing, the MSCA is 2 times larger than the amount of main storage provided on the ES/3090 system which has been no more than 1 GB of main storage on the old and still current processors. This system operated with at least one-half of the entries in the MSCA (2 G which had to be provided for the 31 bit addressing) necessarily marked invalid before our invention. As a result, a "hole" has existed at the upper end of the absolute address space seen by the executing program. It is this hole which supports the definition of an addressing exception, and it is the exploitation of this hole and the ability of the control program to modify the contents of the MSCA in an LPAR environment which forms the basis of the old and still current DSR design.

On a system (e.g. ES/3090) with DSR installed, LPAR is able to map guest storage across the entire 2 GB host absolute address space. That is, by using appropriate origin and limit values, LPAR positions the individual guest storages in the host address space in such a way that the one large hole at the top of the host space is replaced by several smaller ones, with a smaller hole, if needed, directly above each of the guest storages. Then, with PCE assistance, LPAR manipulates the contents of the system's MSCA so as to map the guest storage into physical storage and to make the MSCA entries associated with the holes invalid.

However, when sufficient real addressing capability is not available to provide a range of holes in the host absolute addressing space without leaving some physical storage unused, storage reconfiguration can not be implemented in the old machines. Thus, when someone would actually like to have 2 G of physical memory, the prior system could not accommodate this need. The present invention solves the problems discussed above, and allows the desired advance.

SUMMARY OF THE INVENTION

Our invention is applicable to computer systems. These computer systems will have multiple functional units (CPUs) and the system can be a scalar system, a parallel system, or a massively parallel system. One or more processors of the system will be assigned as a "host". The host will be assigned "main memory". The main memory or storage assigned to the host is known as host storage, and host storage can be shared by one or more processing systems by logical partition used by a guest. Thus our invention is applicable to computer systems which allow the resources of the same physical system which has memory and interactive functional processor(s) interact with the memory to permit the separation and allocation of these physical resources to be supported by the system's interpretive execution facility performed by a hypervisor, which overall system is known as a host, and which overall system will have guests which can actually map absolute storage in the hosts absolute storage which can be raised to the maximum storage addressable by the bit addressing scheme used by the system. The invention allows multiple segments in a partition to be used to reconfigure any guest zone in a memory and allows this with main and expanded storage, taking full advantage of physical memory.

Our invention creates segments in a zone and to allow a guest's absolute storage space to be mapped to a plurality of discontiguous host absolute storage spaces. As an example of the power of the system, our invention provides a computer system which can have 2 G of physical memory with the ability by its multi (dual) zone relocation facility to be capable of relocating multiple zones of the memory of the computer system into one or more zones or zone segments while allowing a control program being executed in its data processing system to reconfigure storages that are assigned to guests when sufficient real addressing capability is not available to provide a range of holes in the host absolute addressing space.

Our invention allows the segmentation of a zone of the memory space and then allows individual ones of plural segments of a zone to be logically moved to another physical zone or zone segment of the main store.

Our invention provides computer systems with a multi-zone relocation facility capable of relocating multiple zones of the memory of the computer system. The computer system provides a control program which can be executed in its data processing system for reconfiguring physical storage that is assigned to guests when sufficient real addressing capability is not available to provide a range of holes in the host absolute addressing space.

The control program enables the reconfiguration of memory to allow main storage and expanded storage associated with a guest's real storage to be mapped to plural discontiguous host absolute spaces.

When sufficient real addressing is not available in the host absolute addressing space to allow for a method of enabling control program of reconfiguring of memory, the multi-zone relocation facility allows storage reconfiguration expansion of the host absolute storage space that maps a guest storage.

The multi-zone relocation facility provides the I/O subsystem of a computer system with a capability which permits the I/O subsystem to notify a hypervisor that a new zone partition parameters are in effect. This can be done by a channel report word.

The multi-zone relocation facility eliminates past restrictions on the storage addressing capabilities; and eliminates the restriction of any guest address structures. This eliminates prefetching and page table entries.

In accordance with our invention a guest prefix area is mapped to the host absolute address. This does not require a segment that replaces the highest range of guest storage to be mapped to a host absolute address range that is higher than the segment that maps the lowest guest real address range.

In accordance with our invention zone address checking is provided by a method that increases reliability by using an EF/DI adder as a checker, and registers pre-loaded with constants. In addition, two parallel comparators and adders allow one cycle resolution.

Our detailed description explains the preferred embodiments of our invention, together with advantages and features, by way of example with reference to the following drawings.

A partition is divided into two or multiple segments. In this FIG. 6, only two segments are shown.

Figure 3:
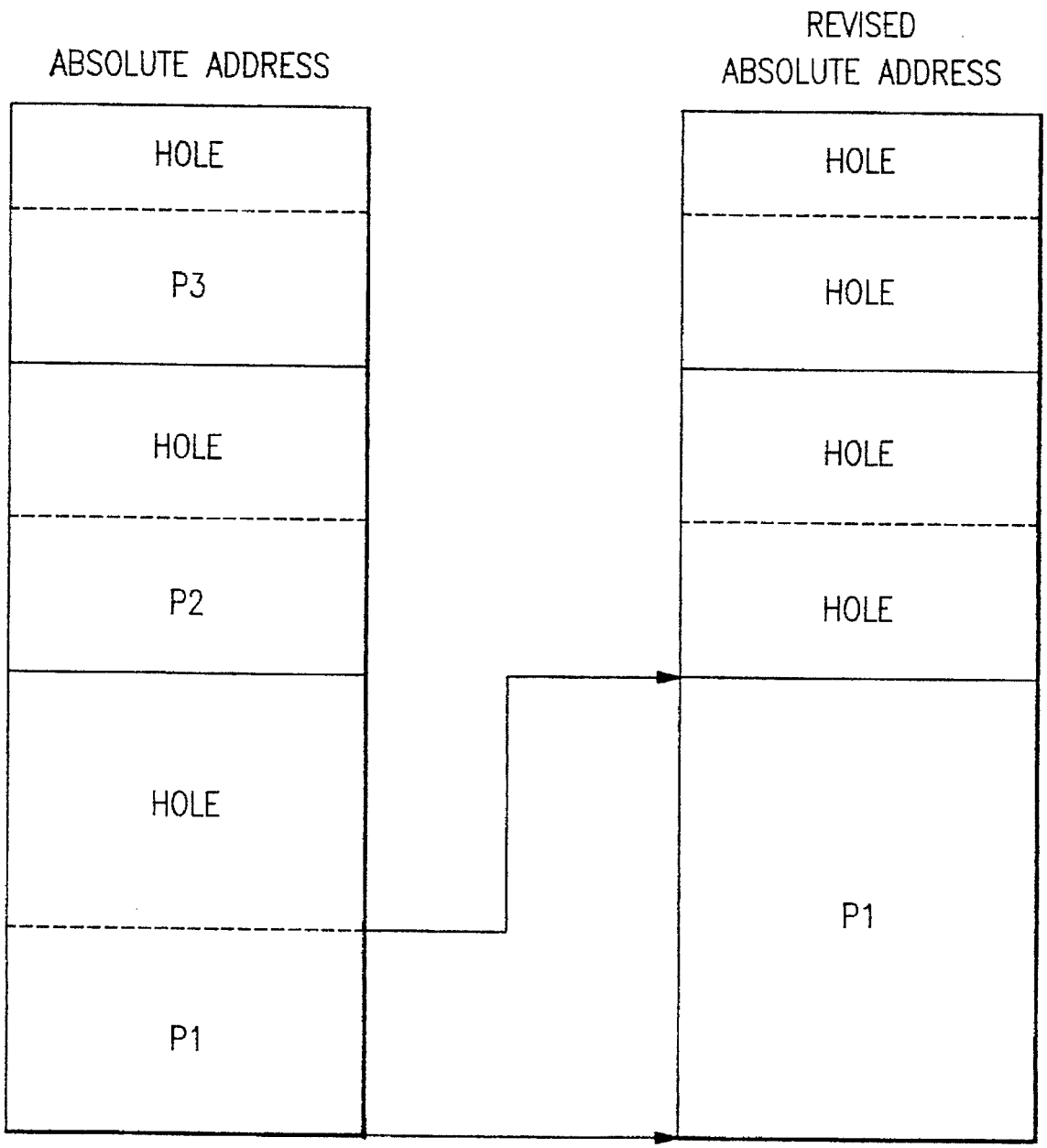

FIG. 3 shows schematically an overview of IBM's approach to storage mapping to reconfigure storage by using holes in the host absolute address space. It is this development internal to IBM that we described in the background. Our invention improves the usage of physical memory space and allows for larger memories.

Figure 4A:
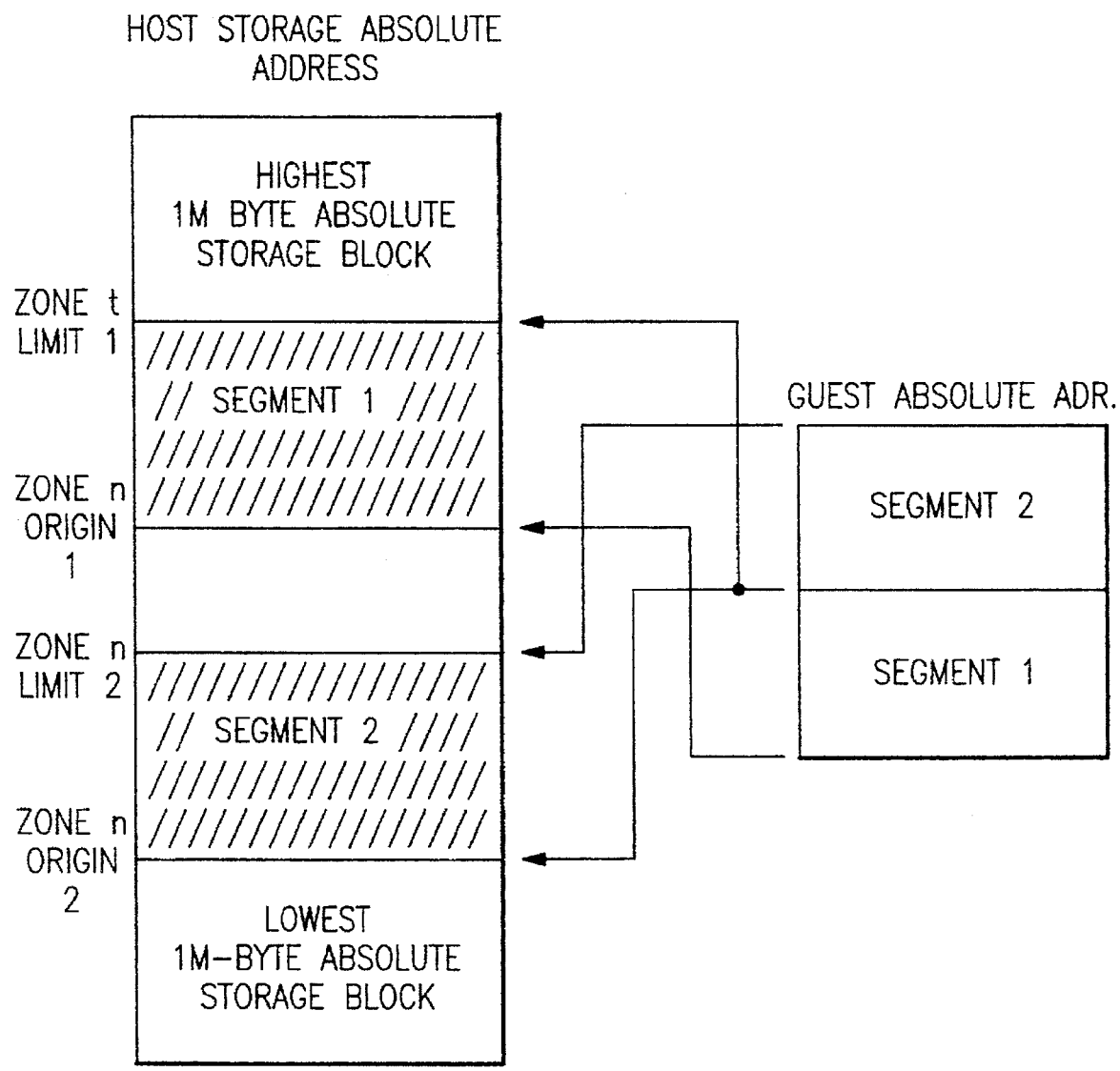

FIG. 4A shows a dual zone storage mapping. A partition is divided into two or multiple segments. In this FIGURE, only two segments are shown.

Figure 4B:
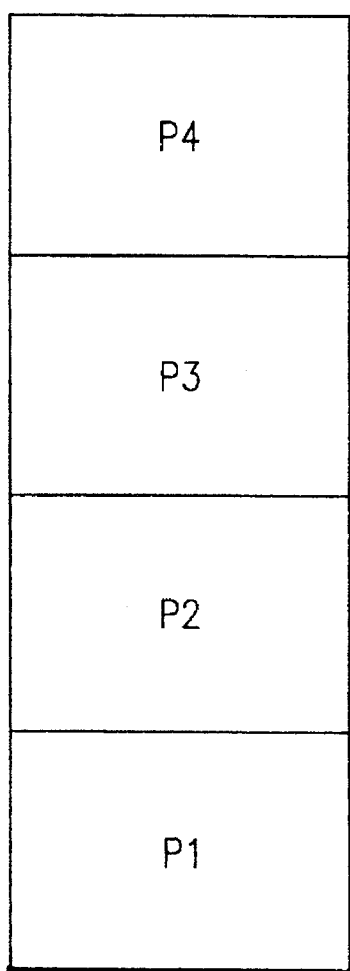

FIG. 4B shows a multiple zone mapping into physical memory.

Figure 5:
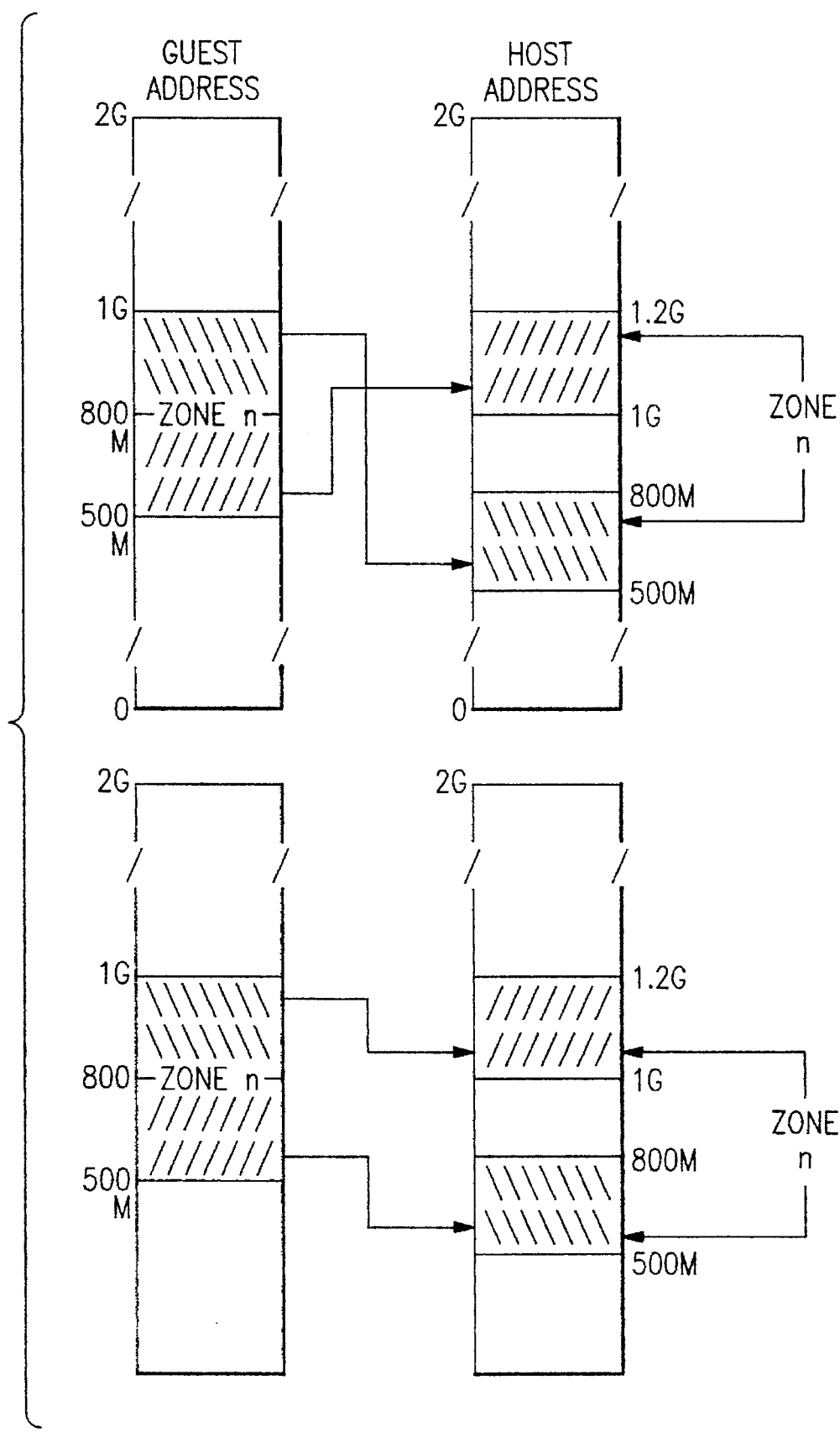

FIG. 5 shows two examples of guest and host storage mapping.

Figure 6:
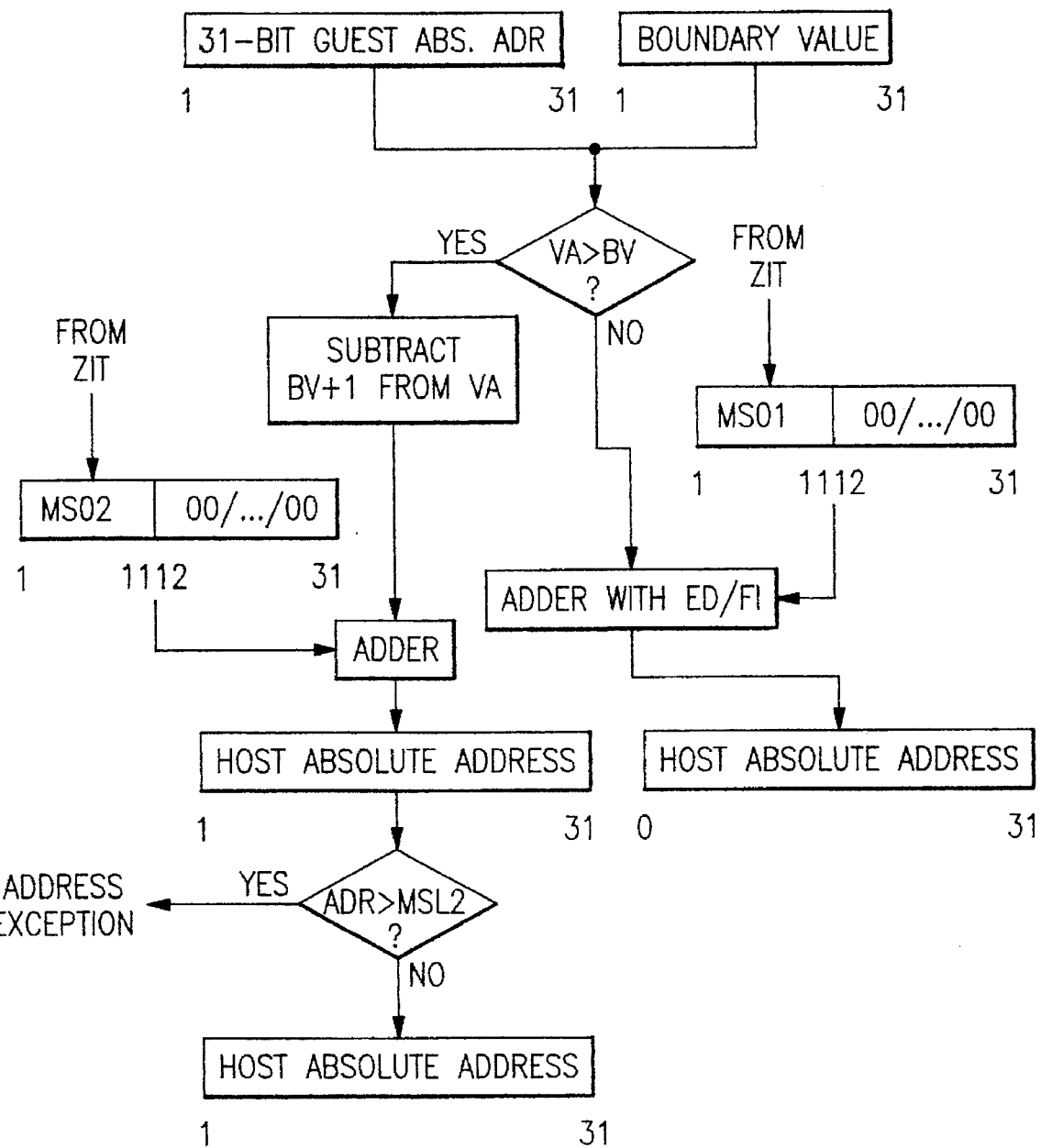

FIG. 6 shows a host address calculation of the dual zone address translation facility. This example of multi-zone relocation is for dual mode. Main storage origin 1 and main storage origin 2 are obtained from the zone information table in the system area storage.

Figures 7, 8:
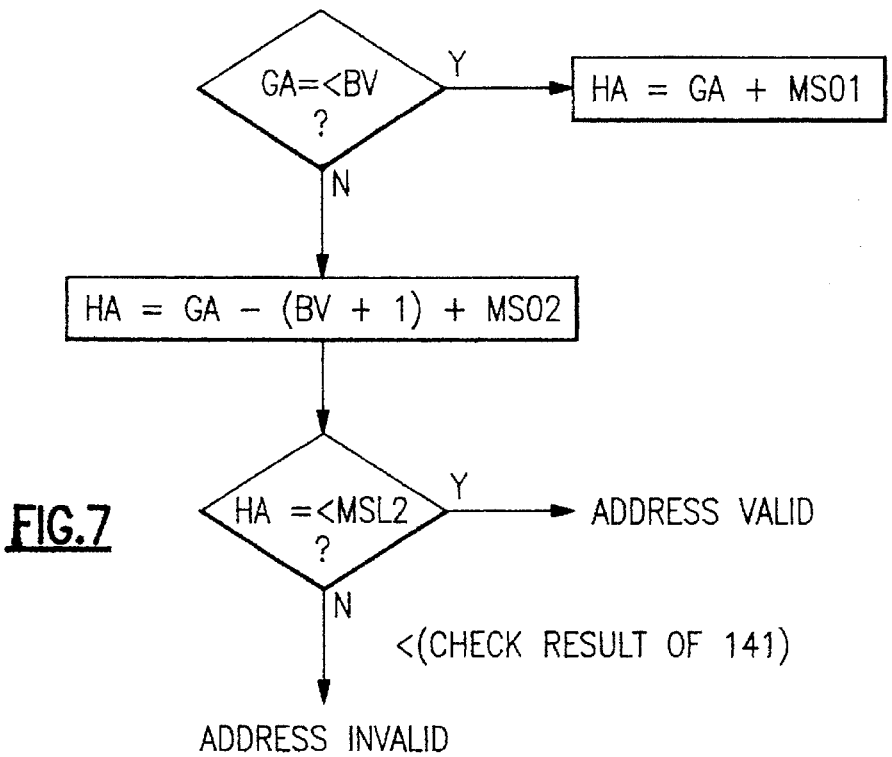

FIG. 7 shows an address checking scheme of I/O subsystem.

FIG. 8 shows a set zone parameter list when SET ZONE PARAMETER instruction is issued.

DETAILED DESCRIPTION OF THE INVENTION

Figure 1:
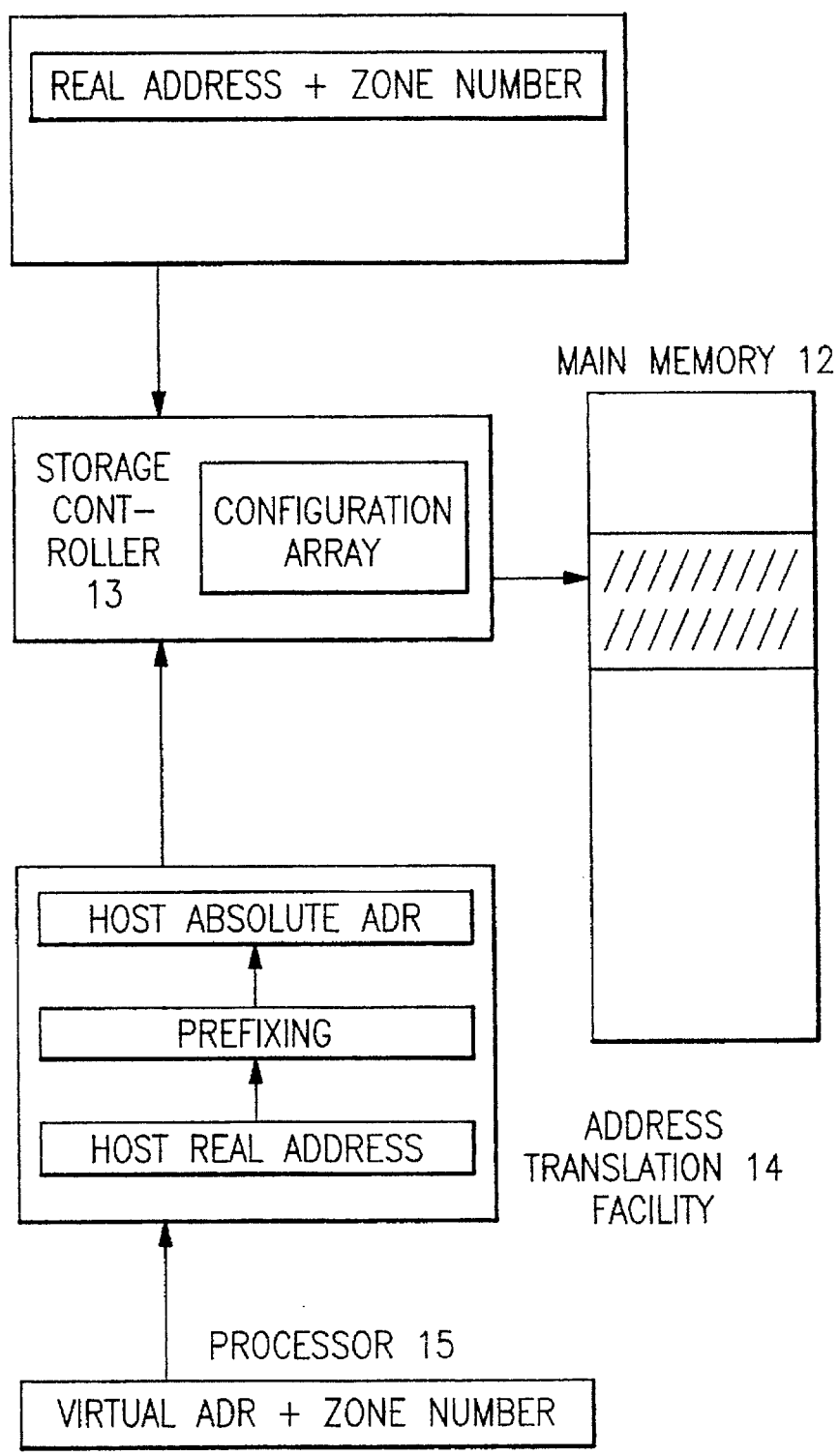
FIG. 1 shows schematically an overview of prior art of address translation.

FIG. 1 illustrates schematically the prior address translation scheme used in the the ES/3090 and other current IBM machines. On the current DSR as the amount of physical storage installed on a system increases, the amount of host address space available for holes decreases, and that when the amount of storage reaches the maximum which can be addressed by the machine (e.g., 2 GB with 31-bit addressing), then the holes simply disappear. The problem with this FIG. 1 example is that the computer system cannot offer the current DSR method if a physical memory with 2 GB with 31 bit addressing is installed, as would be desirable.

FIG. 1 representing the prior art provided for a processor 15 an address translation facility 14 which received from the processor 15 a virtual address and zone number and translated the host virtual address into a host real address with prefixing into a host absolute address. This host absolute address was supplied to a storage controller 13 for memory array configuration. The storage controller 13 also receives from an I/O subsystem 11 under hypervisor control the real address and zone number. With this information the storage controller 13 configures the main memory into zones (shown by hash marks).* In both FIG. 1 and FIG. 2 a configuration array maps the correlation between host absolute address to physical memory where the "contiguous" storage may be spread throughout the physical system.

THE PREFERRED EMBODIMENT

Figure 2:
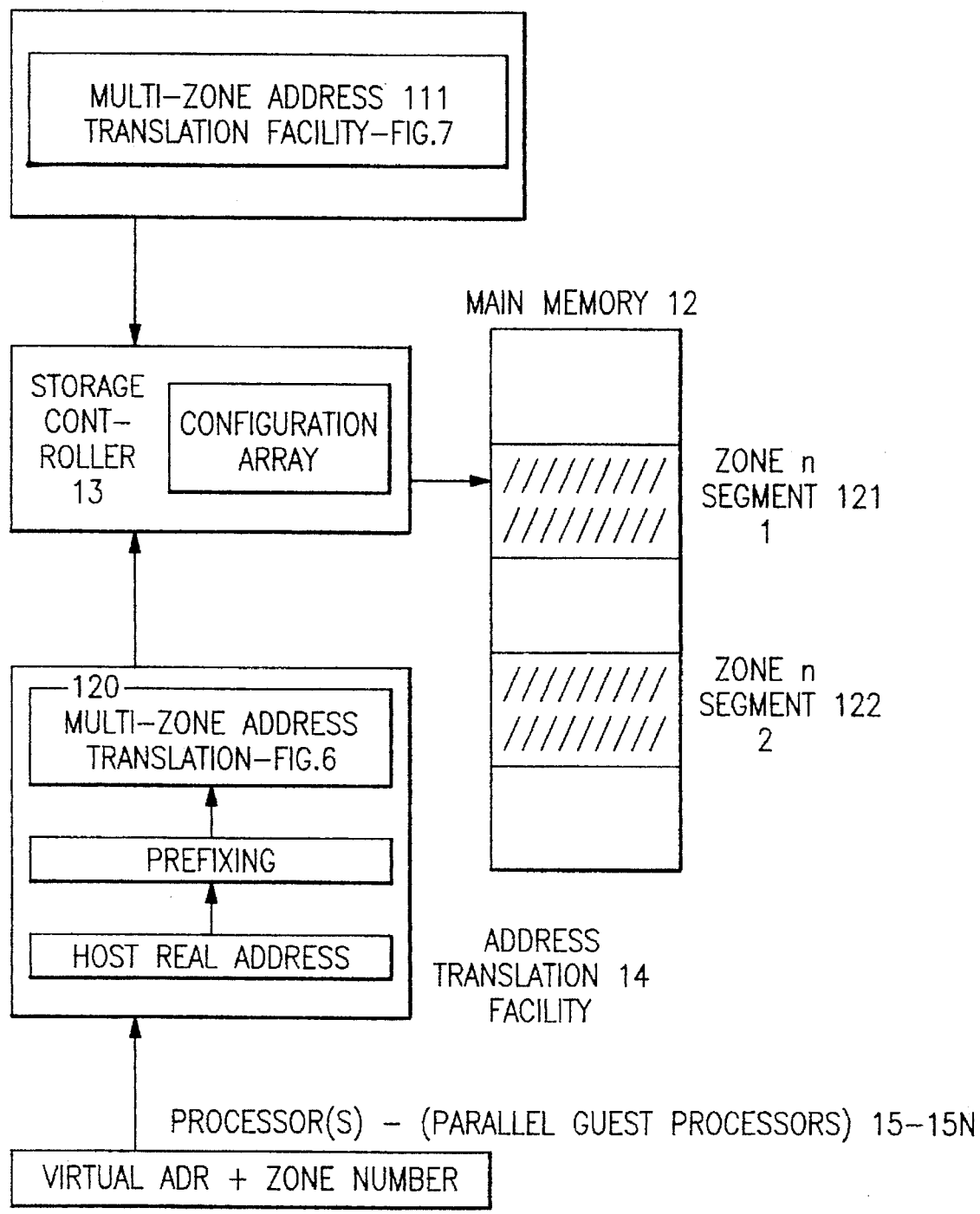
FIG. 2 shows schematically an overview of the address translation by using the multi (dual) zone address translation facility. The guest absolute address are translated via the multi (dual) zone address translation facility shown in the FIG. 6.

Turning now to our invention in greater detail, it will be seen that FIG. 2 illustrates our preferred embodiment.

This invention is schematically illustrated in FIG. 2 wherein the host storage (Main Memory) is assigned to any given logical partition to consist of two or more non-contiguous segments defined by two or more sets of origin and limit parameters. So as part of each guest storage reference, and as a result of our invention, a test is made to determine whether the address falls within the first segment and, failing this test, a second test can be made to determine whether it falls within the second segment. A failure of the last test would then constitute a guest addressing exception which is used to check an invalid address.

FIG. 2 representing the invention provided for multiple processors or one processor 15-15N an address translation facility 14 which received from the processor 15 a virtual address and zone number and translated the host virtual address into a host real address with prefixing with a multi zone address translation facility 120 for the processor(s) to provide a host absolute address which corresponds to the guest's address. This host guest's absolute address can fall into zone segments which may even be discontiguous and is supplied to the storage controller 13 for memory array configuration. The storage controller 13 also receives from an I/O subsystem 11 under hypervisor control the real address and zone number from the multi-zone address translation facility 111 shown in FIG. 7 of the I/O sybsystem. With this information the storage controller 13 configures the main memory into zones (shown by hash marks) which may for any zone "n" be in plural segments 1 and 2. In accordance with our preferred embodiment the zone segment addressing is complete when transferred to the storage controller 13. Thus, the storage controller can utilize different elements of storage as a block corresponding to a contiguous range of guest absolute storage while in fact the partition may include plural segments.

This facility expands the PR/SM dynamic storage reconfiguration (DSR) facility of the old ES/3090 and current IBM systems. Our multi-zone main storage relocation facility allows a guest's absolute storage space to be mapped to two or more discontiguous host absolute storage spaces. In this application, we illustrate a plural zone mode in the form of only two segments that are applied within a partition (dual zone mode). It will be understood by those skilled in the art that the segments do not have to be two but the main storage could be configured with other plural segments in the manner illustrated to provide a multi zone mode within a partition. Thus while dual is illustrated in the drawings, we will subsequently refer to the mode illustrated as a "multi-zone" one.

All partitions are initialized over a contiguous range of storage, as is done with the current DSR. The control program uses the multi-zone mode when it is called on to perform a storage reconfiguration. When a partition issues a reconfiguration-inducing command, the control program invokes multi-zone function to reassign storage. The multi-zone mode form of the zone parameters list contains an origin/limit pair for each of the two contiguous host absolute address ranges that the partition is mapped to as shown in FIG. 2.

Dual zone mode allows zones to consist of two discontiguous segments of the host absolute storage. A multi zone mode includes the dual zone mode and allows zones to comprise a plurality of discontiguous segments of the available absolute storage. FIG. 3 depicts the mapping of a guest absolute address range onto contiguous host absolute storage zones as done in a development within IBM before we made our invention. As P1 needs more address space it is taken by remapping storage of P2 and P3 into the "hole" and this in turn effectively deletes zones or partitions 2 and 3, since they were used in the revised address needed for partition 1.

FIG. 4A illustrates how a guest absolute address can be mapped into a host storage absolute address with two discontiguous segments. The appearance of the segments in the host absolute storage with respect to address position does not have to be in the same order as the guest address. The host storage absolute address can range throughout the memory of the physical system.

FIG. 4B illustrates another remapping of the host storage absolute address into a host storage absolute address with two discontiguous segments which may exist in different partitions of the system. This shows how partition 1 adds storages and partition 3 gives up storage, but still is not deleted.

Figure 4B:
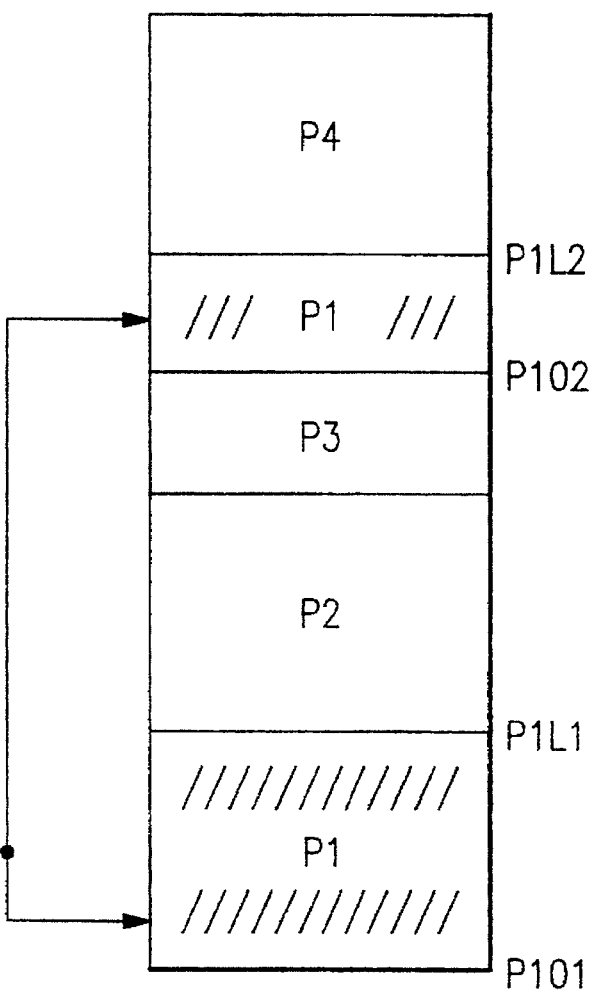

When multi-zone mode is selected, each time a storage access is attempted the boundary value (BV) is compared with the zone absolute address according to FIG. 6. The 31-bit boundary value is defined as the zone absolute address that is generated by subtracting the 31-bit main storage segment origin 1 (MSO1) from the 31-bit main storage segment limit 1 (MSL1). If the zone absolute address is equal to or less than the boundary value, 31-bit main storage origin 1 (MSO1) value is added to the zone absolute address to generate the main storage absolute address. If the zone absolute address is greater than the boundary value, 31-bit main storage segment origin 2 (MSO2) value is added to the absolute address, subtracting the boundary value plus 1. If this value is greater than main storage segment limit 2 (MSL2), the host main-storage location is not available and access to it is prevented by the zone-relocation facility. If a host main-storage location is not available, it is said to have an invalid address. These actions are illustrated in the FIG. 4.

FIG. 5 shows two examples of mapping from guest to host absolute address space into two discontiguous segments in the host absolute address space where the high address range of the guest range does not have to be the high address segment of the host absolute mapping as illustrated in the top of the FIGURE, while it still can map to the high address segment of the host absolute address as shown in the bottom of the FIGURE.

In order to achieve the multi-segment partition facility dynamically for main memory (main store) for a computer system which can have a plurality of logical processor(s) which can be implemented by machines having parallel functional units (CPUs), the control program will implement a process which employs the following steps:

1. Stop dispatching any logical processors for the partition that absolute storage was being removed from. (This is done in order to stop any new requests to storage).
2. Issue, if necessary, a SET ZONE PARAMETER instruction to remove the storage from a partition.
3. Wait for the I/O subsystem to notify LPAR that the new zone origin was in effect via a new channel report word.
4. Issue a SET ZONE PARAMETER instruction to increase the receiving partitions storage limit.

The zone-parameter list has this format as shown in the FIG. 8 and our preferred embodiment is described below.

Flag:
Bits 0–1 of word 0 contain validity flags for corresponding fields in the zone parameter list:

Main Storage:
When one, bit 0 of word 0 indicates that the zone-parameter list specifies multi-segment mode in main storage. Bit 0, when zero, indicates that the zone-parameter list specifies single-segment mode in main storage.

Expanded Storage:
When one, bit 1 of word 0 indicates that the zone-parameter list specifies multi-segment mode in expanded storage. Bit 1, when zero, indicates that the zone-parameter list specifies single-segment mode in expanded storage.

Main-Storage Segment Origin 1 (MSO1):
Bits 21–31 of word 0 specify the beginning of segment 1 in main storage on a 1M-byte boundary for the specified zone number. When a subchannel is associated with this zone number, the main-storage segment origin 1 value, with 20 zeros appended on the right, forms a 31-bit absolute address in host main storage, which is added to the program-specified CCW, IDAW, or I/O-data-area address to form a 31-bit absolute address and then used to perform the appropriate main-storage access for that subchannel.

Main-Storage Segment Limit 1 (MSL1):
Bits 21–31 of word 1 specify the last byte of segment 1 in main storage for the specified zone number. When a subchannel is associated with this zone number, the main-storage segment limit 1 value, with 20 ones appended on the right, forms a 31-bit main-storage-segment limit. The main-storage-segment limit must be equal to or greater than the results of the address computation when an absolute address in host main storage is generated by using the associated main-storage-segment origin.

This definition provides a minimum main storage zone of 1M bytes. A zone containing no bytes cannot be specified.

Expanded Storage Segment Origin 1 (ESO1):
Bits 8–31 of word 2 specify the beginning of segment 1 in expanded storage on a 256-page boundary for the specified zone number. When a subchannel is associated with this zone number, the expanded-storage segment origin 1 value, with eight zeros appended on the right, forms a 32-bit unsigned binary integer. This unsigned binary integer is added to the expanded-storage block number for the I/O-data area used by the channel program to form a 32-bit host expanded-storage-block number, which is then used to perform the appropriate expanded-storage access for that subchannel.

Expanded-Storage Segment Limit 1 (ESL1):
Bits 8–31 of word 3 specify the last page of segment 1 in expanded storage for the specified zone number. When a subchannel is associated with this zone number, the expanded-storage segment limit 1 value, with eight ones appended on the right, forms a 32-bit unsigned binary integer. This unsigned binary integer must be equal to or greater than the results of the address arithmetic used when generating an expanded-storage block number using the associated expanded-storage zone origin.

If the model does not provide multi-segment mode or if the model provides multi-segment mode but multi-segment mode is not selected, the value for the MSO2, MSL2, ESO2, and ESL2 are ignored. MS stands for Main Store, while ES stands for Expanded Store. O stands for origin, while L stands for limit.

Main-Storage Segment Origin 2 (MSO2):
When bit 0 of word 0 is one, bits 21–31 of word 4 specify the beginning of segment 2 in main storage on a 1M-byte boundary for the specified zone number. When a subchannel is associated with this zone number, the main-storage segment origin 1 value, with 20 zeros appended on the right, forms a 31-bit absolute address in host main storage, which is added to the program-specified CCW, IDAW, or I/O-data-area address to form a 31-bit absolute address and then used to perform the appropriate main-storage access for that subchannel.

Main-Storage Segment Limit 2 (MSL2):
When bit 0 of word 0 is one, bits 21–31 of word 5 specify the last byte of segment 2 in main storage for the specified zone number. When a subchannel is associated with this zone number, the main-storage segment limit 2 value, with 20 ones appended on the right, forms a 31-bit main-storage segment limit. The main-storage segment limit must be equal to or greater than the results of the address computation when an absolute address in host main storage is generated by using the associated main-storage segment origin.

Expanded-Storage Zone Origin 2 (ESO2):
When bit 1 of word 0 is one, bits 8–31 of word 6 specify the beginning of segment 2 in expanded storage on a 256-page boundary for the specified zone. When a subchannel is associated with this zone number, the expanded-storage segment origin 2 value, with eight zeros appended on the right, forms a 32-bit unsigned binary integer. This unsigned binary integer is added to the expanded-storage block number for the I/O-data area used by the channel program to form a 32-bit host expanded-storage-block number, which is then used to perform the appropriate expanded-storage access for that subchannel.

Expanded-Storage Segment Limit 2 (ESL2):
When bit 1 of word 0 is one, bits 8–31 of word 7 specify the last page of segment 2 in expanded storage for the specified zone number. When a subchannel is associated with this zone number, the expanded-storage segment limit 2 value, with eight ones appended on the right, forms a 32-bit unsigned binary integer. This unsigned binary integer must be equal to or greater than the results of the address arithmetic used when generating an expanded-storage block number using the associated expanded-storage zone origin.

FIG. 6 represents how the CPU facility itself can perform the translation while FIG. 7 represents the checking function 141 and steps which are provided by the control program.

FIG. 6 performs the translation for CPU multi-segment zone reconfiguration. The output of the FIG. 6 represents the host absolute address which corresponds to the 31 Bit Absolute Address which is the input shown at the top of the FIGURE. Also inputs are the Main Storage Limit 1 (MSL1) which comes from the Zone Information Table (Zone Parameters List or ZIT) and the Main Storage Origin 1 (MSO1 which is also received from the Zone Information Table (ZIT). With the steps and circuits shown the translation to the host absolute address used is performed. Checking is done by the Adder which receives the translation from the MSO1. This adder 141 includes a zone address checker including an ED/FI (error detection/fault isolation) adder, as a checker, and registers which are preloaded with constants and parallel 2 comparators with the adder for one cycle resolution.

FIG. 7 illustrates the checking function by the output of HA=< MSL2, which if answered NO provides an indication that the address is invalid. If answered Yes, the address is valid. This illustrates the logic by which the channel translator develops a host absolute address from a guest absolute address with the constants, MSO1, BV, MSL2 and (BV+1) +MSO2 as we discussed in connection with FIG. 8 above. The checking function 141 provides a No for an invalid address indication. The function is provided by the zone address checker adder 141 described in the circuit of FIG. 6.

ALTERNATIVE PREFERRED EMBODIMENTS

Our preferred embodiment illustrates addition of 2 GB physical memory with a machine having 31 bit addressing. It should be understood that the problem (expanding physical memory addressing beyond the normal limits of the address space permitted by the number of bits afforded for addressing) is applicable to larger additions of physical memory. In massive memories, physical memory can be greater than 2 GB. In massively parallel machines host storage may be distributed throughout a system, and several hosts become "guests" which can interact with the physical main storage. In the described system, and in massively parallel machines, host storage can be assigned as illustrated in the schematic illustration of our invention which will be described. As the host storage can be schematically illustrated as we have already done, there is no need for additional drawings to illustrate the replication of the existing system to allow for illustration of host storage which can be assigned throughout a system in which several "hosts" interact with main storage. Main storage assigned to a host in systems with massive banks of memory can now have physical memory assigned to befit the need.

The system we describe which provides a control program as part of a data processing system operating within a host computer system in any of the possible processors, which will have a plurality of processors functional units, memory and a hypervisor permitting the data processing system to operate as a guest logical processor of the host computer system which has memory arrays assignable in addressable zones, a translation circuit and process for mapping a guest's real storage to plural discontiguous host absolute addresses. The control program for reconfiguring memory allows storage reconfiguration when sufficient real addressing is not available in the host absolute addressing space to allow for expansion of the host absolute storage space that maps the guest's storage. The system can be used in combination with an computer system I/O subsystem which can notifying hypervisor of the computer system that a new zone origin paramenters for the data processing system are in effect.

The system we have described can be used with or without channel translation; however, in those kinds of multiprocessing systems which do use a channel translation, the system can be employed very effecively for channel translation. Such a system will (as we described) have a plurality of processors and coupled physical memories which can be addressed as memory arrays assignable in addressable zones, and a hypervisor permitting the data processing system to operate as a guest logical processor of the host computer system which has been defined to allow memory arrays to be assignable in addressable zones. The channel translator function can employ the process we described above for accessing memory and providing a conversion of a guest absolute address to a host absolute address in order to acessess memory. This conversion process then can employ a mapping of memory into plural discontiguous portions while permitting to a guest to consider the portions as contiguous zones. The systems which have been built by Fujitsu in the past could be modified to employ our invention by adding the additional features we have described. In such a possible embodiment the mapping of memory into plural discontiguous portions includes mapping a guest's real storage to plural discontiguous host absolute addresses; and the system has a control program for reconfiguring memory to allow storage reconfiguration when sufficient real addressing is not available in the host absolute addressing space to allow for expansion of the host absolute storage space that maps the guest's storage.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. In a computer system with a main host memory and a plurality of logical guest processors, each of said logical guest processors assigned a zone in said host memory of contiguous address space defined by a zone origin and a zone limit, a method for dynamically reorganizing said main host memory by means of a control program, said method including the steps of:

activating a multi-zone facility to map for a first logical processor a first guest absolute address zone to at least two discontiguous segments of the main host memory address space, each of said discontiguous segments having a zone origin value and a zone limit value;

removing from a second guest absolute address zone mapped for a second logical processor at least a part of its main host memory address space in one of said at least two discontiguous segments;

blocking access to said part by said second logical processor; and issuing an instruction to increase the storage limit of said first logical processor after notification by an I/O subsystem response that new zone origin and zone limit values are in effect for said first logical processor.

* * * * *